March 17, 1931.  W. W. NUGENT  1,796,531
LUBRICATING SYSTEM
Filed Oct. 20, 1924   2 Sheets-Sheet 1
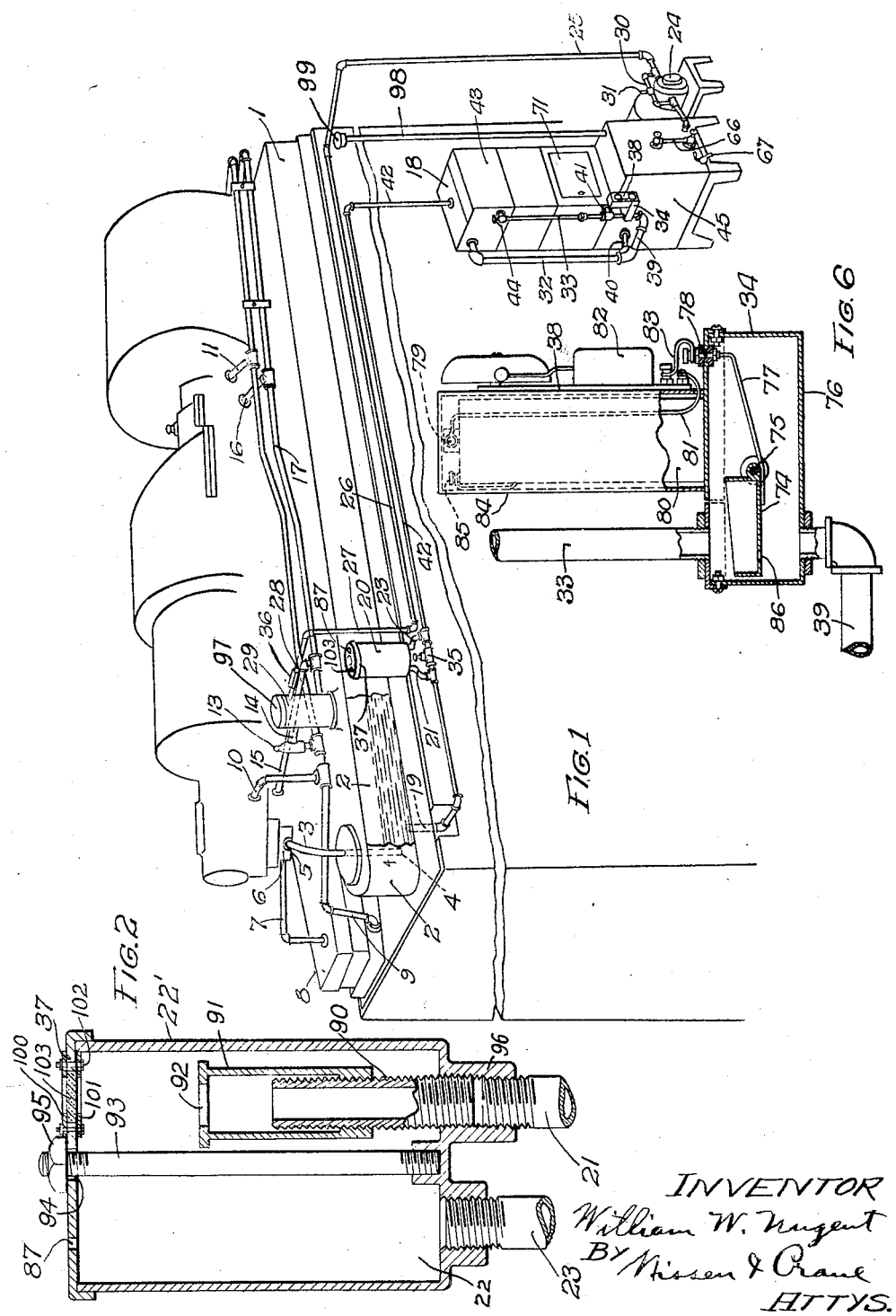
INVENTOR
William W. Nugent
BY Nissen & Crane
ATTYS.

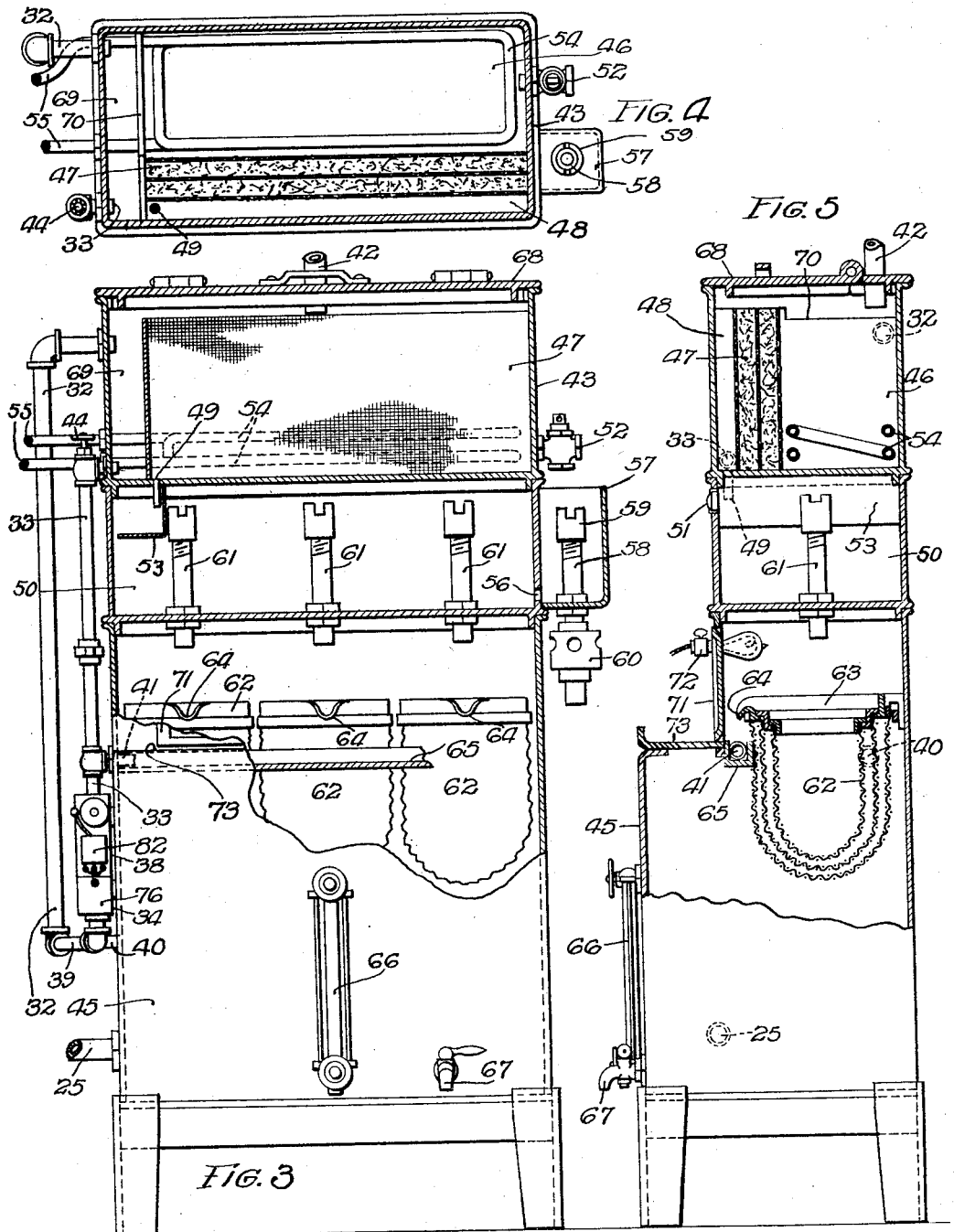

Patented Mar. 17, 1931

1,796,531

UNITED STATES PATENT OFFICE

WILLIAM W. NUGENT, OF CHICAGO, ILLINOIS

LUBRICATING SYSTEM

Application filed October 20, 1924. Serial No. 744,558.

My invention relates to lubricating systems and one of its objects is to provide improved mechanism for purifying the lubricant without interfering with the operation of the lubricating system.

Another object of the invention is the provision of means for maintaining a surplus of lubricant for purifying purposes over that required in the lubricating system.

A further object is the provision of adjustable gravity feed mechanism to purifying apparatus from a lubricating system.

More particularly it is the object of the present invention to provide improved adjustable mechanism for taking portions of lubricant from a lubricating system, purifying such portions and returning the same to the lubricating system without interfering with the operation of the latter.

Other objects of the invention will appear hereinafter, the novel features and combinations being set forth in the appended claims.

In the drawings—

Fig. 1 is a perspective view of a steam turbine and a lubricating system including a filtering device.

Fig. 2 is a perspective view of an adjustable overflow device having portions of the outer casing cut away to disclose underlying parts.

Fig. 3 is a perspective elevational view, partly in section, of the preferred type of filtering apparatus for use in the system shown in Fig. 1;

Fig. 4 is a plan view of the filtering apparatus shown in Fig. 3;

Fig. 5 is a side elevation in section of the filtering apparatus shown in Fig. 3; and Fig. 6 is a detail view of the automatic overflow alarm mechanism shown in Figs. 1 and 3.

It will be seen in Fig. 1 that a turbine base 1 is provided with an oil reservoir 2, and that a pipe 3 having an opening 4 at one end is connected at its other end 5 to a suction pump 6. The open end of the pipe 3 extends into the oil reservoir 2 and is slightly submerged below surface of the oil within the same. The suction oil pump 6 draws the oil from the reservoir 2 through the pipe 3 and discharges said oil under pressure through the pipe 7 into the cooler 8. After the oil has been cooled in the usual manner it is discharged from the cooler 8 into the supply pipe 9 which communicates with branch pipes such as pipes 10 and 11 adapted to deliver the lubricant to the bearings of the turbine. A relief valve 13 is disposed between two successive links of the main supply pipe 9 and is adapted to discharge excess oil through the pipe 14 into the oil receiver or filling pot 29 of the reservoir 2. The pump 6 is provided to deliver oil under a predetermined pressure to the bearings and moving parts of the engine and in the event that said predetermined pressure is exceeded the relief valve 13 will be opened and some of the oil will pass through the pipe 14 into the oil receiver 29 from whence it flows into the oil reservoir 2. Oil will continue to flow through the relief valve 13 as described above until the pressure in the system becomes equal to or slightly less than the predetermined amount. When the pressure in the system reaches the predetermined degree, the relief valve automatically closes. Return branch pipes 15 and 16 communicate with the bearings of the turbine through openings thereinto located slightly below the branch pipes 10 and 11 respectively. The return branch pipes communicate with a main return pipe 17 which delivers used oil to the reservoir 2.

It will be seen that the oil is supplied to the system from the reservoir 2 and that the used lubricant is returned to the same. My improvement provides means by which the dirty oil and water that collects at the bottom of the reservoir is drawn off and conveyed to my filtering and water separating device 18 wherein the oil is separated from the water and other impurities. The dirty oil and water passes through the pipe 19 into an adjustable overflow 20 provided to prevent said pipe 19 from draining the reservoir. It will be seen in Fig. 2 that the adjustable overflow comprises a stand pipe 21 enclosed within a metal casing 22' having a top metal closure 37, said stand pipe being extensible vertically and by adjustment of the same the level of the oil in the reservoir 2 can be correspondingly adjusted. The vertical stand pipe 21 is threaded into the neck 96 at the bottom of the casing 22' and communicates with the externally threaded pipe 90 which is also threaded into the neck 96. A sleeve 91 has a screw-threaded fit over the upper portion of the pipe 90 to afford an adjustable extension of the pipe 90. The upper end of the sleeve 91 has an opening 92, the elevation of which varies according to the degree of turning of the sleeve nut 91 on the screw-threaded pipe 90. The cover 37 is detachable and may be secured in place by means of the bolt 93 and nut 95. The cover 37 having a glass window 103 held by rings 100, 101 and bolts 102. The bolt 93 is secured at its lower end to the bottom of the casing 22' and at its upper end is adapted to extend through the opening 94 in the cover 37. By fastening the nut 95 the cover 37 may be retained firmly in place on top of the casing 22' with the circular glass window 103 directly above the opening 92.

Fig. 1 shows the pipe 19 connected between the reservoir 2 and the pipe 21. Oil flows from the reservoir 2 and into the stand pipe 21 to a height equal to the level of the upper surface of the oil in the reservoir provided the opening 92 is at or above such elevation. The sleeve nut 91 may be lowered, however, until the opening 92 is below the level of the oil in the reservoir, whereupon the oil will flow from the sleeve 91 into the casing 22'. By this arrangement the amount of oil received by the casing 22' will always be automatically limited by the depth of the oil in the reservoir 2 and a certain predetermined depth of oil in the reservoir will always be maintained in the latter. Ample depth of oil in the reservoir will therefore always be maintained for the turbine lubricating system. It should be particularly noted that since the cover 37 is removable the casing 22' may be made opaque and so also the cover 37 because whenever inspection is desired or adjustment of the sleeve nut 91 required the cover 37 may be readily removed. After inspection and adjustment the cover may be replaced and again secured in place by the nut 95. A vent hole 87 is provided in the cover 37 to prevent a siphoning action. The oil rises in the stand pipe 21 and spills over into the enclosed chamber 22 of the adjustable overflow device 20 and is drained therefrom through an opening in the bottom of said chamber into the pipe 23. The pipes 23 and 42 communicate with my filtering device 18 which may be located, as shown in Fig. 1, on the floor below the turbine base. It is apparent that my improved lubricating and filtering system may profitably be installed in plants where floor space is of primary consideration, for all equipment additional to the ordinarily employed may be placed in the basement below the turbine or engine. A contaminated mixture of water, oil and solid impurities is delivered by the pipe 42 to my filtering device wherein the oil is separated from the water and solid impurities. The clean oil is forced by the pump 24 up into the pipe 25 and through the pipes 26, 27 and 28 into the filling pot 29 which in turn delivers the cleaned oil to the reservoir 2. A bypass 30 is provided around the pump 24, having a valve 31 to regulate the flow of oil through said bypass. It will be seen that when the bypass 30 is completely closed, all the oil delivered by the pump 24 will be forced up the pipe 25 and eventually into the reservoir 2. With the turbine operated at constant speed the flow of oil from the reservoir through the pipe 3 will remain constant, thus an increased delivery of oil to said reservoir would cause an increased amount of dirty oil to spill over the adjustable stand pipe 21. As the oil that spills over the stand pipe 21 is delivered to the filtering device 18, it is apparent that the amount of lubricant filtered per day may be determined by adjusting the bypass valve 31. When the valve 31 is partly open some of the clean oil circulates through the bypass 30.

In the event that an abnormal quantity of oil is delivered to the filtering device the overflowing oil will be conveyed by the bypass pipes 32 and 33 to a lower compartment of said filtering device. As the oil passes through the bypass pipe 33, it operates alarm mechanism which causes the electric bell 38 to ring, thus notifying the attendant that an adjustment is needed.

A valve 35 is disposed between the inlet to the adjustable overflow and the outlet therefrom and is normally kept closed, but it may be opened occasionally, however, to permit the oil to flow directly from the reservoir 2 to the filtering mechanism 18 and thus to flush the pipes and thereby remove accumulated sediment.

A sight gauge 36 may be disposed between successive links of the pipe 28 to disclose the oil as it flows into the oil receiver or filling pot 29.

Thus it will be seen that my improvement provides an oil filtering system that may be applied to turbines, engines, ammonia compressors, and the like. It is further pointed out that the used oil is taken from an oil reservoir, purified and returned to said reservoir, from whence it is pumped to the moving parts of a machine. The filtering device and the lubricating mechanism are thus connected in parallel with each other.

The filtering apparatus 18 is equipped with overflow alarm mechanism comprising a bypass 33 connected to the alarm mechanism 34 comprising an electric bell 38. When the filter in the uppermost section of the filter becomes clogged and overflows, as hereinafter more fully pointed out, the oil passes down the pipe 33 to operate the automatic alarm and after being used in the latter the oil passes through the pipe 39 to the intake opening 40 and thence into the lower section or oil reservoir of the filter apparatus 18. A branch pipe is connected at 41 to the pipe 33 to effect operation of the alarm when the filter elements in an intermediate section of the filter become clogged and overflow. It will thus be seen that when the filtering mechanism becomes inoperative the attendant is immediately notified by the alarm mechanism that his attention is required.

When the flow of oil from the adjustable overflow 20 through the pipe 42 exceeds the capacity of the filtering apparatus the uppermost compartment 43 may overflow into the pipe 32 which is preferably of larger internal diameter than that of the pipe 33. The upper end of the pipe 33 communicates with the bottom portion of a compartment in the top section 43, while the upper end of the pipe 32 communicates with the upper portion of the same compartment. If oil flows through the pipe 33 to the alarm mechanism, operation of the latter may be discontinued by the attendant closing the valve 44, thereby stopping flow of oil into the pipe 33. The oil may flow uninterruptedly, however, into the large pipe 32 and through the pipe 39 to the oil reservoir 45. The bypass 32 is useful to take care of a sudden rush of a quantity of oil from the turbine and thus the danger of oil spilling on the floor is eliminated. When only filtered oil can be permitted to pass into the reservoir 45 the pipe 39 may be connected to a drain or sump tank, but in the system disclosed in Fig. 1 it is preferred to let the oil flow through the connection 40 into the reservoir 45, so as to maintain a predetermined depth of oil in the chamber 2.

The details of the interior construction of the filter 18 of Fig. 1 will be more fully understood by referring to Figs. 3, 4 and 5. The oil to be filtered flows from the pipe 42 into the compartment 46 of the uppermost section 43 and then passes through the filter wall 47 composed of spaced-apart sheets of reticulated metal with the spaces between filled with filtering material, such as animal hair which, when clogged with dirt, may be removed and replaced with clean hair. After passing through the filter wall 47 the oil enters the compartment 48 out of which it flows by gravity at 49 into the water separating chamber 50. A sight flow opening may be provided at 51 opposite the nozzle 49. A valve 52 may be provided for the compartment 46. Normally this valve is closed but may be opened when it is desired to clean sediment out of the compartment 46.

In the water separating chamber 50 is located a baffle plate 53 to freely circulate the incoming mixture. A heating pipe 54 with exterior connections at 55 for circulation of steam, hot water or electricity may also be provided for the compartment 46 above the water separating chamber. The water in this chamber 50 descends and passes through the opening 56 into the exterior box 57 which is open on the upper side and has a pipe 58 extending up therein a predetermined distance. This pipe is open at its top and bottom and has an adjustable extension 59 at its upper end and a sight flow device 60 at its lower end.

In the water separating chamber are a plurality of substantially vertical oil pipes 61, each open at its upper end and each provided with an adjustable extension at its upper end. These adjustable extensions may be regulated in accordance with the level of the support for the filtering apparatus as a whole. Thus the oil may be caused to flow equally through the pipes 61, the extensions 59 being adjusted at a lower level so that the water will flow through the pipe 58 to waste.

The adjustable stand pipes 61 may be replaced by a rectangular box having the top thereof open and having a plurality of openings in its bottom registering with corresponding openings in the bottom of the separating chamber. Thus the vertical sides and ends of the rectangular box provide weir members over which the water-free oil flows into the box. The oil received by the box passes through the openings in the bottom thereof and through the corresponding openings in the bottom of the separating chamber, and eventually into the filtering members 62 positioned therebelow.

The box-form weir is particularly adapted to the filtering device herein disclosed when said device is positioned on a substantially level support or standard. The sides and ends of the interior box may be of any desired length. By providing a substantially long weir edge it will be seen that the film of oil that flows thereover will be comparatively thin and thus the possibility of water passing over with the oil will be greatly reduced. In the event that a thick film of oil is permitted to pass over the weir edge it is most likely that the liquid surrounding the weir would be disturbed and that some of the water would mix with the oil and pass over therewith. By providing a comparatively long weir edge the flow of oil is distributed over the entire length of the same and the sheet or film of oil passing thereover is comparatively thin.

From the pipe 61 the oil flows or drips into the filter elements 62, each consisting of a plurality of nested filter bags suspended from rings 63, the uppermost one of which has an overflow spout 64 in position to deliver oil to the trough 65, when the bag becomes clogged and should be cleaned or renewed. From the trough 65 the oil flows to the pipe 41 into the pipe 33 and thence to the alarm apparatus. Through the filter bags the oil flows into the tank 45.

The glass gauge 66 may be used to indicate the oil is properly flowing back to the oil reservoir 2 in the turbine base. A spigot 67 may be used to remove oil from the chamber 45 when desired. Oil may be supplied to the system by lifting the lid 68 and pouring it into the compartment 46, or by removing the lid 97 and placing it in the pot 29; or by introducing the oil into the fill pipe 98 at the opening 99 which may be located at the turbine floor level.

It should be particularly noted that in the upper section 43 an entirely separate compartment 69 is provided. The adjacent compartment 46 is provided with a partition, the upper edge 70 of which is below the top of the filter wall 47 and the compartment 48. When the filter 47 becomes clogged or when the flow of oil from the pipe 42 exceeds the capacity of the filter the compartment 46 will fill up until the oil overflows the edge 70 into the separating chamber 69. The upper end of the pipe 33 communicates with the bottom of the compartment 69 and therefore if the valve 44 is open the oil will first flow down the pipe 33 to operate the alarm mechanism to call the attendant. However if the chamber 69 fills rapidly the oil will consequently flow into the large pipe 32. The upper end of the latter is connected to compartment 69 at a substantial distance above the upper end of the pipe 33.

For the purpose of facilitating inspection of the filter bags when the door 71 is open a suitable incandescent lamp may be provided as shown at 72. A tray 73 is provided in front of the filter chamber above the tank 45 to receive the drip from the filter elements when removed for the purpose of cleaning the same.

The preferred form of alarm mechanism is shown in Fig. 6. When oil flows down the pipe 33 it fills the tray 74 which is pivoted at 75 to the box 76. The oil in the tray tilts the latter so that the arm 77 closes the electric switch 78. A circuit will be closed from one terminal 79 of the dry cell 80 through the wire 81, electric bell 82, wire 83, switch 78, arm 77, metal castings 76 and 84 to the other terminal 85 of the dry cell. The electric bell 82 will continue to ring as long as the overflow continues through the pipe 33. When this overflow ceases, however, the oil in the tray 74 will drain out of the restricted opening 86 into the casing 76. Whatever oil flows into the casing 76 will flow into the pipe 39 and thence into the tank 45. When the oil has been drained out of the tray 74 the latter will be automatically moved up or restored to its initial position and this will cause the arm 77 to move down and open the switch 78, thereby interrupting the circuit from the battery through the electric bell. The alarm mechanism will therefore automatically cease its operation and automatically restore itself to normal soon after the overflow of oil ceases, in readiness for another automatic operation when the oil again overflows.

When the adjustable gravity overflow 20 is installed the opening 92 at the top of the extension 90, 91 is at first preferably on a level with the level of the oil usually carried in the turbine base 2. Then adjustment may be made by removing the cover 37 and lowering the sleeve nut 91 to suit conditions. For instance, if the reservoir 2 in the turbine base contains seventy-two gallons of oil the adjustment of the opening 92 may be such as to receive by gravity into the chamber 22 twelve gallons of oil per hour, the capacity of the filtering apparatus 18 and of the pump 24 being ample to take care of this amount. Assuming a filtering capacity of twelve gallons per hour and seventy-two gallons of oil in the reservoir 2 of the turbine base, the oil in the latter would be filtered and purified four times every twenty-four hours. This has been found sufficient for practical purposes, but it should be understood that the rate of purification may be varied within wide limits, and this is particularly true by reason of the adjustment in elevation of the port 92. The rate at which the pump 24 supplies the oil to the pipe 25 and thence to the reservoir 2 may be regulated by the valve 31 in the bypass 30. When the turbine is out of operation and its lubricating system stopped the valve 35 may be opened and the oil drained from the reservoir 2 into the filter and into the storage tank 45, from which it may be pumped by the pump 24 back into the reservoir 2. But after the oil has thus been drawn from the reservoir 2 to free it from accumulated sediment it may be returned to the reservoir 2. The valve 35 should be closed, however, when the predetermined depth in the reservoir 2 is to be attained.

The valve 35 may be entirely omitted, however, so that there will be no communication between the pipe 19 and the pipe 42, except through the adjustable overflow 20. Then there would be no valves to forget to open and close under any conditions of normal operation. The filter cannot clog up and overflow without notifying the engineer. If the alarm should fail to operate the oil will flow through the bypass 33 or the bypasses 33 and 32 back into the filter. If the pump 24 should stop and the engineer fails to observe that there is no oil flowing through the sight feed 36 in the clean oil pipe 28 near the turbine, the filter reservoir or tank 45 is of ample capacity to take care of that portion of the oil in the reservoir 2 above the level of the port 92 in the overflow 20. It will thus be seen that the system is entirely automatic and operated in parallel with the lubricating system so as not to interfere with the latter's operation at any time. It will also be evident that the bypass pipes 33 and 32 will prevent spilling of oil on the floor if there should at any time be a sudden rush of oil from the turbine to the filter beyond the capacity of the filter elements. Furthermore, the filter elements may upon operation of the alarm or indicating mechanism, be individually removed without interrupting the continuous automatic operation of the purifying cycles.

Obviously those skilled in the art may make various changes in the details and arrangement of parts without departing from the spirit and scope of the invention defined by the claims hereto appended, and it is therefore desired not to be restricted to the precise construction herein disclosed.

Having thus fully described and shown an embodiment of the invention, what is desired to be secured by Letters Patent of the United States is:

I claim:

1. In lubricating mechanism, the combination with an oil pump, of an oil reservoir, a filtering device, an adjustable overflow to predetermine the quantity of oil in said reservoir and to regulate the gravity flow of oil to said filtering device, a by-pass for the pump to convey oil from the discharge side of said pump to the intake side of said pump, thereby reducing the quantity of oil delivered by said pump to said reservoir.

2. In oil purifying apparatus for a lubricating system, the combination with an oil reservoir, of automatic oil purifying apparatus, a gravity connection between said reservoir and said oil purifying apparatus for directing oil from said reservoir to said oil purifying apparatus by gravity, means in said connection for maintaining a predetermined depth of oil in said reservoir, said oil in the reservoir flowing through said connection to said oil purifying apparatus only when the oil exceeds such predetermined depth, mechanism rendering such depth variable by adjustment, and means for supplying oil from said purifying apparatus back to said reservoir.

3. In oil purifying apparatus for an automatic lubricating system, the combination with an oil reservoir, of oil purifying apparatus, means for directing oil from said reservoir by gravity to said oil desired purifying apparatus, means for delivering purified oil from said purifying apparatus back to said reservoir, and an overflow port adjustable substantially in elevation to compel the oil in the reservoir to reach a predetermined depth in accordance with the adjustment in elevation of said port before the oil will flow from said reservoir to said oil purifying apparatus.

4. In a combined lubricating and oil purifying system, the combination with a lubricating system comprising an oil reservoir, of an overflow adjustable in height in accordance with the depth of the oil in said reservoir, oil purifying apparatus connected to said reservoir to receive oil therefrom, and means comprising a pump for delivering oil from said oil purifying apparatus back to said reservoir thereby increasing the depth of the oil in said reservoir sufficiently to cause oil to pass through said overflow from said reservoir to said oil purifying apparatus.

5. In oil purifying apparatus for a lubricating system, the combination with an oil reservoir, of an adjustable overflow comprising a receptacle connected to said reservoir to receive oil therefrom and an extensible standpipe with an intake port for receiving oil from said receptacle at various elevations in accordance with the adjustment in elevation of such port, oil purifying apparatus connected to said extensible standpipe to receive oil from said port, and means for effecting automatically the circulation of oil from said reservoir to said receptacle and through said port to said oil purifying apparatus and from the latter back to said oil reservoir.

6. A lubricant purifying circulating system for lubricating apparatus comprising a reservoir, a lubricant purifier, a gravity overflow device comprising a receptacle with an overflow port therein adjustable from a position intermediate the ends of the receptacle to a position at the upper end of the receptacle, connections for said gravity overflow device to said reservoir and to said lubricant purifier, and means for directing purified lubricant from said purifier back to said reservoir.

7. In lubricant purifying apparatus for a lubricating system comprising a reservoir, a lubricant purifier, an overflow gravity feed device connected between said reservoir and said purifier to maintain the depth of the lubricant in said reservoir at a predetermined amount and directing overflow to said purifier, said overflow device comprising an intake port adjustable in elevation to vary the depth of the lubricant in said reservoir from substantially half capacity to full capacity, and means for directing purified lubricant from said purifier back to said reservoir.

8. In oil purifying apparatus for a lubricating system, the combination with an oil reservoir, of oil purifying mechanism connected thereto to receive oil therefrom, means comprising a pump for delivering purified oil from said purifying mechanism back to said reservoir, and automatic signalling mechanism for indicating overflow of oil in said purifying mechanism.

9. In an oil purifying system for lubricating apparatus, the combination with an oil reservoir, of an adjustable overflow device connected thereto for maintaining a predetermined depth of oil therein, oil purifying mechanism for receiving oil from said adjustable overflow device, means comprising a pump with an adjustable by-pass for delivering a regulated flow of oil from said purifying mechanism to said reservoir, and signalling mechanism for said purifying mechanism to indicate overflow therein and notifying the attendant that attention to the purifying mechanism is necessary and adjustments desirable to regulate the flow to and from the purifying mechanism.

In testimony whereof I have signed my name to this specification on this 17th day of October, A. D. 1924.

WILLIAM W. NUGENT.